(12) United States Patent
Patel et al.

(10) Patent No.: US 9,920,173 B2
(45) Date of Patent: Mar. 20, 2018

(54) MIXING AND PROCESSING OF RUBBER COMPOSITIONS CONTAINING POLAR FILLERS

(71) Applicant: Tun Abdul Razak Research Centre, Brickendonbury, Hertfordshire (GB)

(72) Inventors: Jaymini Patel, Harrow (GB); Pamela Jean Martin, Cheshunt (GB); Stuart Cook, Royston (GB)

(73) Assignee: Tun Abdul Razak Research Centre, Brickendonbury, Hertfordshire (GB)

( * ) Notice: Subject to any disclaimer, the term of this patent is extended or adjusted under 35 U.S.C. 154(b) by 16 days.

(21) Appl. No.: 15/035,042

(22) PCT Filed: Nov. 11, 2014

(86) PCT No.: PCT/GB2014/053343
§ 371 (c)(1),
(2) Date: May 6, 2016

(87) PCT Pub. No.: WO2015/067970
PCT Pub. Date: May 14, 2015

(65) Prior Publication Data
US 2016/0289396 A1    Oct. 6, 2016

(30) Foreign Application Priority Data
Nov. 11, 2013   (GB) .................................. 1319877.5

(51) Int. Cl.
*C08J 3/205* (2006.01)
*C08K 3/04* (2006.01)
*C08K 3/36* (2006.01)

(52) U.S. Cl.
CPC ............... *C08J 3/2053* (2013.01); *C08K 3/04* (2013.01); *C08K 3/36* (2013.01); *C08J 2300/00* (2013.01); *C08J 2307/00* (2013.01); *C08J 2309/00* (2013.01); *C08J 2309/06* (2013.01); *C08J 2321/00* (2013.01)

(58) Field of Classification Search
CPC ..................................................... C08J 3/2053
See application file for complete search history.

(56) References Cited

U.S. PATENT DOCUMENTS

2005/0080179 A1    4/2005   Kim et al.

FOREIGN PATENT DOCUMENTS

| CN | 102108144 A | * | 6/2011 |
| GB | 770773 A | | 3/1957 |
| WO | WO0037555 A1 | | 6/2000 |

OTHER PUBLICATIONS

Machine translation of CN 102108144, 2011.*
Database WPI, Week 201157 Thomson Scientific, London, GB, AN 2011-J87034, XP002735493, -& CN 102 108 144 A (Agric Prod Processing Res Inst Chinese A) Jun. 29, 2011, abstract.
Luo et al., Interaction Between Fumed-Silica and Epoxidized Natural Rubber, Journal of Inorganic and Organometallic Polymers and Materials (Dec. 2011), 21(4):777-783.

* cited by examiner

*Primary Examiner* — Wenwen Cai
(74) *Attorney, Agent, or Firm* — Rudy J. Ng; Bret E. Field; Bozicevic, Field & Francis LLP

(57) ABSTRACT

Rubber compounds comprising one or more rubber with polar functionality and one or more polar filler are prepared by a method comprising the steps: (i) adding a polar volatile liquid to the polar filler; (ii) mixing the one or more rubber with polar functionality with the polar volatile liquid and polar filler to produce a dispersion of the polar filler in the one or more rubber; and (iii) removing the polar volatile liquid from the dispersion. The invention Improves the consistency and uniformity of mixing of rubber compounds based on elastomers having polar functionality, such as epoxidized natural rubber, containing polar reinforcing fillers, such as precipitated silica, The compounds, when vulcanized, have improved mechanical properties. The method is particularly useful in the manufacture of vehicle tires.

12 Claims, 1 Drawing Sheet

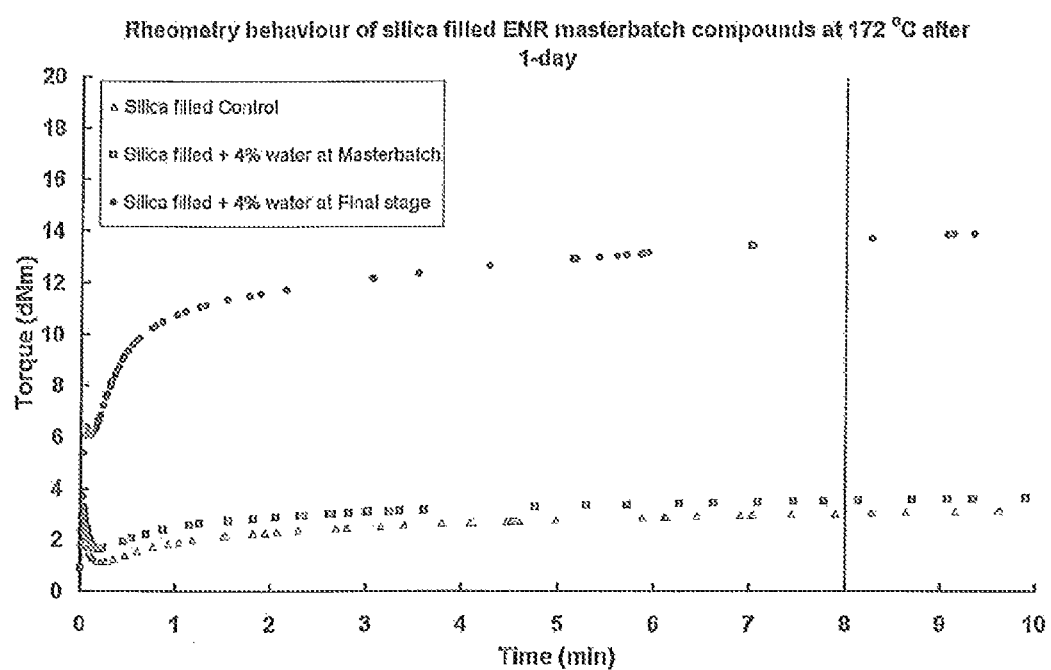

MIXING AND PROCESSING OF RUBBER COMPOSITIONS CONTAINING POLAR FILLERS

The present invention relates to improvements in mixing and processing characteristics of rubbers with polar functionality when mixed with polar fillers. In particular, it relates to the addition of low levels of volatile polar liquids or fluids to aid mixing when used in conjunction with rubbers having polar functionality and polar fillers and to improve the processing behaviour of such rubber compounds and mechanical properties of the resulting vulcanised compound.

The presence of large proportions of water has previously been proposed in GB 770,773 to be advantageous in the mixing of rubber compounds with inorganic filler materials which are in the form of wet cake containing between 15%-50% by weight of solid. The presence of such an excess amount of water in the mixing of elastomers containing polar functionality such as ENR with polar fillers such as precipitated silica has, in our hands however, been found to be deleterious to the physical characteristics of the compound and residual water has been found to result in undesirable cure behaviour in such compounds. Furthermore, GB 770,773 makes no consideration of the use of rubbers with polar functionality but only to natural rubber.

US 2005/0080179A1 teaches a method for mixing non polar rubbers with silicate mineral filler wherein excess water (a silicate mineral-to-water weight ratio of between 1:4 to 10:1) is employed in conjunction with silane coupling agent to achieve an improvement in the efficiency of reaction of the silane coupling agent, leading to improved mechanical properties of the resulting vulcanisate, lower heat generation during mixing and fast cure characteristics as well as the more efficient elimination of the alcohol generated from the silane coupling agent during mixing. US 2005/0080179A1 however makes no consideration of the use of rubbers with polar functionality which have the ability to interact strongly with polar fillers such as precipitated silica and does not address the specific problems that the mixing and processing of this class of rubber compounds possess.

WO 0037555 identifies that the presence of very high levels of water can effect a cure in silica filled ENR. According to this, however, the presence of excess residual water or other polar volatile liquid during the cure of compounds comprising rubbers with polar functionality such as ENR with polar fillers such as precipitated silica, is specifically identified as being deleterious to the cure behaviour and subsequent physical properties of such compounds, and is to be avoided.

The application of precipitated silica filler in epoxidised natural rubber compounds has found particular significance in passenger vehicle tyres where low rolling resistance and good wet grip performance, in particular, have become important considerations for tyre manufacturers and consumers alike. The relevance of silica filled ENR tyre compounds has increased in recent years as a result of the growth in the application of 'green technologies' and an increasing environmental awareness which promotes the use of materials from renewable and sustainable sources and the reduction of the carbon footprint of products and processes.

In recent years, it has become commonplace for premium quality tyre tread compounds designed for low rolling resistance and good wet grip to make use of solution styrene-butadiene rubber/butadiene rubber (sSBR/BR) blends together with precipitated silica filler. For such compounds, comprising of a non-polar elastomer or blends of non-polar elastomers, containing a polar filler such as precipitated silica, it is accepted that it is necessary to use significant quantities of a coupling agent, such as bis(tri-ethoxysilylpropyl)-tetrasulphide (TESPT), to provide adequate filler dispersion during the mixing process and upon vulcanisation to also provide the level of interaction, or coupling, between the rubber and the filler necessary for good tyre properties. The use of a coupling agent such as TESPT however typically requires between 5-10 wt % (based on the weight of silica used) of the coupling agent to be used. In addition, specific mixing procedures are required to be followed to ensure that the coupling agent reacts fully with the surface of the silica filler during mixing to aid dispersion but does not react prematurely with the rubber to effect permanent coupling of the rubber to the filler before the compound is vulcanised. These requirements can add consideration to the duration and complexity of mixing and add to the overall cost of the process.

An additional advantage that ENR based compounds exhibit over commonly used hydrocarbon based elastomers, where precipitated silica is used to achieve low rolling resistance and good wet grip, originates from the inherently strong interaction developed between silica and ENR. The development of this strong interaction may reduce, or even eliminate the requirement for a coupling agent to achieve adequate dispersion of the filler during mixing and to attain the degree of coupling between the rubber and the filler necessary for good tyre performance.

In preparing rubber compounds, such as those tyre compounds based on silica filled ENR, the silica is more difficult to incorporate rapidly and disperse adequately than other less polar fillers such as carbon black. In particular, when mixing using an internal mixer, compound and filler can rise up the throat of mixer and rise above the ram when it is lowered. This behaviour can also result in poor homogeneity of the batch and with increased 'batch to batch' variability in mixing. Silica filled ENR masterbatch compounds can also show poor coherence in the mixing chamber and dump from the mixer as a crumbly mass of small pieces. These poor mixing characteristics can require extended periods of mixing to ensure that all of the compound and filler is subjected to adequate mixing in the mixing chamber and that the batch dumps in a coherent mass so facilitating subsequent downstream processing activities.

Furthermore, larger particles or agglomerates of polar fillers, such as precipitated silica, are known to be resistant to being broken down and to be distributed and dispersed effectively in rubber compounds and this can result in unsatisfactory vulcanizate compound properties being obtained, which in a tyre tread compound can lead to, amongst other things, excessive heat generation and inferior resistance to abrasion giving increased rolling resistance and wear performance in the tyre.

Silica filled ENR compounds, especially where high loadings of precipitated silica are used (>50 phr of silica), can exhibit high viscosities and be difficult to process, even where the addition of process oils or process aids are used. In such cases, it is possible to reduce the compound viscosity by extended mixing or by working for longer on the open mill but these actions are undesirable as they can degrade the mechanical properties of the resulting vulcanised compound as well as add time and cost to the process.

The interaction between precipitated silica and ENR is very significant (as indicated by high 'bound rubber' values) and this interaction provides effective reinforcement of the rubber, beneficial for a wide range of vulcanised rubber properties including strength, hysteresis and abrasion. The strength of this interaction can, itself, however present challenges in the processing of the compound required for the fabrication of products, or of product components. For example, during extrusion (a fabrication process commonly used in the manufacture of tyres), silica filled ENR compounds may exhibit an excessively high degree of swell upon leaving the extrusion die and then over a period of time this can be followed by a high degree of shrinkage of the extrudate. Although such extrudate swell behaviour is also evident for filled rubber compounds where the level of interaction between the rubber and the filler is comparatively low, extrudate swell for these materials is within acceptable limits for most processing applications.

Furthermore, the level of interaction between silica and ENR in an unvulcanised compound can continue to develop and to increase over time, resulting in an increase in compound viscosity and subsequent change in processing behaviour of the compound over time. The dimensional stability of ENR filled with precipitated silica following processing can thus be dependent upon the time that has elapsed since the compound was mixed or processed. In a rubber product manufacturing environment, such a degree of compound instability, resulting from very high levels of rubber filler interaction, can make silica filled ENR difficult to extrude consistently and may result in the compound being unable to meet the dimensional tolerances required for factory processes such as tyre building.

Moreover, final state ENR compounds reinforced with precipitated silica (which contain curatives but have yet to be vulcanized), can exhibit a 'dry' touch, indicative of low surface tack. This characteristic is found not to improve significantly at typical process temperatures of between 60°-130° C. Surface tack is a critical requirement for tyre building where good adhesion is required between the tread and carcass compounds and with the sidewall compound in order to fabricate a tyre to a high standard. Poor tack can also result in air entrapment between critical tyre components leading to inadequate bonding between these components with the potential for catastrophic failure of the tyre in service.

The processing behaviour of unvulcanised ENR compounds containing high levels of precipitated silica filler (>50 phr) is such that the surface finish of the extrudate is typically rough with poor surface finish and inferior definition at the edges of the extrudate.

A common factor in all of the above problems is the strong interaction that is developed between rubbers such as ENR, which have polar functionality, and polar fillers, such as precipitated silica. While such interaction is required for effective reinforcement and is beneficial for ultimate vulcanizate properties, it acts to inhibit the development of the characteristics preferred for the effective mixing and processing of unvulcanised rubber compound as described above. Rubbers such as butadiene rubber or styrene butadiene rubber, which possess a much reduced ability to interact strongly with polar fillers, although not possessing a range of vulcanised compound properties comparable to those of precipitated silica filled ENR or example, do not exhibit the same range of mixing and processing deficiencies as identified above for compounds based on ENR or other rubbers with polar functionality.

An object of the present invention is to improve the consistency and uniformity of mixing of rubber compounds based on elastomers having polar functionality, such as epoxidized natural rubber, containing polar reinforcing fillers, such as precipitated silica. An additional objective of the invention is to improve the mechanical properties of the resulting vulcanised compounds, in particular in relation to the mechanical properties required for good tyre performance.

The present invention is based on the surprising discovery that the addition of low levels of polar volatile liquids to the compound ingredients prior to mixing, or to the rubber compound during the initial stages of mixing, allows these objectives to be met.

Accordingly, the present invention provides a method for preparing rubber compounds comprising one or more rubber with polar functionality and one or more polar filler which method comprises the steps:
(i) adding a polar volatile liquid to the polar filler;
(ii) mixing the one or more rubber with polar functionality with the polar volatile liquid and polar filler to produce a dispersion of the polar filler in the one or more rubber;
(iii) removing the polar volatile liquid from the dispersion.

The use of the invention results in a more rapid incorporation of polar fillers into the rubber compound where the rubber compound is based on a rubber having polar functionality, thus allowing shorter mixing times. The use of the invention also provides an improvement in the coherence of the compound during mixing and upon dumping of the mix, thus enabling more rapid downstream processing of the compound, for instance when either a train of two roll mills or a dump extruder is used. Furthermore, the use of the invention results in a reduction of the peak Mooney viscosity and also results in improved compound stability which manifests in a more stable Mooney viscosity upon compound storage of compounds based on one or more rubbers with polar functionality containing a polar filler. Furthermore the use of the invention results in a reduction of the amount of extrudate swell of such rubber compounds, an improvement in the surface finish and definition of the edges of the extrudate and an improvement in the degree of surface tack of such rubber compounds comprising one or more rubber having polar functionality and a polar filler. In addition, the use of the invention is effective in improving the mechanical properties of the resulting vulcanised rubber compound. In particular, the Goodrich heat build-up is reduced and Akron abrasion resistance is improved.

The rubber with polar functionality used in the present invention may be, for instance, selected from epoxidized natural rubber, hydroxylated natural rubber, carboxylated natural rubber, epoxidized synthetic rubbers, hydroxylated synthetic rubbers, carboxylated synthetic rubbers, carboxylated nitrile rubber, carboxylated styrene butadiene rubber, hydroxylated styrene butadiene rubber and hydroxylated butadiene rubber. According to a preferred embodiment, the rubber with polar functionality is epoxidized natural rubber. The epoxide content will typically be within the range of from 5 mol % to 75 mol %, preferably from 15 mol % to 65 mol % and more preferably between 20 mol % and 55 mol %.

The polar filler for use in the present invention can be any polar filler having use in rubber compositions. Preferably, the polar filler will be selected from precipitated silica and carbon black that has been modified to contain polar functionality. When the polar filler is a precipitated silica, it will typically have a surface area between 50-250 $m^2/g$ silica.

Typically, the polar volatile liquid used in the present invention will be selected from water and lower alkanols. Examples of suitable lower alkanols include methanol, ethanol and propanol. Preferably, the polar volatile liquid used in the present invention will be water or ethanol.

According to the method of the invention, the polar volatile liquid is added to and mixed with the polar filler before mixing with one or more rubbers having polar functionality. Typically, the polar volatile liquid will be added to the polar filler in an amount of from 0.5% to 10% by weight, preferably from 2 to 6 wt %, based on the weight of the polar filler.

The mixture of the polar volatile liquid and polar filler is then mixed with the one or more rubbers having polar functionality so that the polar filler becomes dispersed in the rubber. Mixing can be effected using any known mixing, blending or extrusion apparatus provided that this ensures that the polar filler will become dispersed, preferably homogeneously, throughout the rubber having polar functionality. Typically, the apparatus used to effect mixing will be an internal mixer such as a Banbury or Intermix mixer or a continuous mixer, such as a twin screw extruder.

Typically, the amount of rubber containing polar functionality used in this mixing/dispersion step will be about 100 parts by weight of rubber per 20 to 120 parts by weight of the polar filler.

In the method of the invention, polar volatile liquid present in the dispersion of the polar filler in the rubber is removed or allowed to evaporate. Preferably, any residual polar volatile liquid should be eliminated before the final stage of mixing when curatives (typically a combination of sulphur and various accelerators) are normally added to the rubber compound. The removal of the volatile polar liquid from the rubber compound is normally achieved during the course of mixing prior to the addition of curatives through normal evaporative processes. The presence of residual polar volatile liquid has a deleterious effect on the cure behaviour of the rubber compound, causing a reduction in available processing time (reduction of scorch safety) and also results in an unpredictable level of cure being achieved, as indicated by the rheometer torque rise.

Indication of the effective removal of residual volatile polar liquid can be provided gravimetrically, comparing the weight of the added volatile polar liquid with the batch weight after mixing, or by weight loss measurement upon efficient drying of the rubber compound. These methods are, however, impractical in large scale mixing in industry where a rapid measurement is often required. An efficient method for determining whether residual polar volatile liquid has been effectively removed has been devised whereby the rheometry characteristics of the compound are assessed prior to curative addition. This is a rapid test using equipment commonly available in a rubber compound mixing facility.

The FIGURE shows a typical rheometer traces for a silica filled ENR tyre compound containing 75 phr silica but no curatives where water has either been added at the first masterbatch mixing stage, or added at a second (final or productive) mixing stage. Water added at the first mixing stage can be subsequently driven off but water added later in the mixing process has little opportunity to be driven off and so excessive residual water still remains in the compound when it is subjected to the high temperatures experienced during curing of a tyre tread compound. The effect of residual water is clear; residual water remaining in the compound results in a significant rapid rheometer torque rise which would result in deleterious compound properties.

The invention is also effective for polar rubbers containing polar fillers, such as silica filled ENR, when used in conjunction with silane coupling agents such as TESPT, or non-coupling silane agents such as octyltriethoxysilane (OTES). The invention is also effective for polar rubbers containing polar fillers, such as silica filled ENR where the silica has a moisture content outside of the normally specified range which for precipitated is between 5-7 wt % moisture. The invention extends the range of climatic regions that are able to make effective use of rubbers containing polar functionality, such as ENR filled with polar fillers such as precipitated silica, to include arid regions where absorbed moisture contents of precipitated silica may be below 5 wt %, and also to include tropical regions where absorbed moisture contents of precipitated silica may be above 7 wt %.

Although we do not wish to be bound by theory, we believe the results achieved by the present invention can be explained as follows.

The polar liquid (water) may be involved in disrupting the otherwise strong filler—filler particle interactions and thus enabling the filler to be dispersed more easily in the polar polymer. The polar polymer (ENR) is still able to interact sufficiently strongly with the dispersed filler particles so that, during further mixing, dispersion is improved still further to a very high level leading to excellent micro and macro dispersion.

The water (or polar liquid) appears able to modify, on a temporary basis, the nature of the interaction between the rubber and filler, inducing predominantly H-bonding rather than a stronger, more permanent covalent or physical interaction. This change in the nature of the interaction we believe allows the rubber to move around on the surface of the filler rather than being essentially fixed so that during processing (mixing, milling and extrusion) the rubber compound can flow more easily and we achieve the improvements in processing behaviour observed. The improved 'tack', we believe also comes from the temporary reduction in the strength of interaction between the rubber and the filler so that there are free polymer chains that are free to stick to other rubbers or other surfaces rather than be associated tightly with the silica surface only.

Polar rubbers that interact with polar filler to give high bound rubber and high volume swelling ratio (Vr) undergo a significant reduction in bound rubber and Vr as a result of the addition of the water (or alcohol) but if the excess water is removed by the time the compound is ready to cure, the interaction between the rubber and filler is fully restored after curing, Vr levels are similar to those found where no water was used during initial mixing.

However, it is critical for the excess water to be driven off before curing the rubber compound, as when excess water is present, elevated temperatures appear to promote excessively high degrees of interaction between the rubber and the filler which brings about a very high level of torque as observed in rheometer cure traces and very high modulus in the cured rubber compound.

In the final vulcanized product, there is no evidence of anything unusual having been done to achieve the benefits we see, the water has long been evaporated off.

Experimental Section

The compound formulations shown below in Table 1 were prepared by simple mixing of the ingredients. The compound formulations 2 and 4 were prepared according to the method of the invention whereby a polar liquid (water) was added to one or more polar filler and then a rubber with polar functionality was blended into the polar liquid/polar filler mixture to produce a dispersion of the filler in the rubber.

The excess polar liquid was removed prior to curing.

TABLE 1

| Formulation | Parts Per Hundred Rubber | | | | |
|---|---|---|---|---|---|
| Compound | 1 | 2 | 3 | 4 | 5 |
| First stage | | | | | |
| sSBR | | | | | 96 |
| cis-BR | | | | | 30 |
| ENR-25 | 100 | 100 | 100 | 100 | |
| Zeosil 1165MP | 75 | 75 | 75 | 75 | 80 |
| N234 Black | 5 | 5 | 5 | 5 | 6.4 |
| Nytex 4700 | 20 | 20 | 20 | 20 | 10 |
| Zinc oxide | 3 | 3 | 3 | 3 | |
| Stearic acid | 3 | 3 | 3 | 1 | 2 |
| 6PPD (Santoflex 13) | 1 | 1 | 1 | 1 | |
| TMQ | 1 | 1 | 1 | 1 | |
| Calcium stearate | 2 | 2 | 2 | 2 | |
| Water | | 3 | | 3 | |
| TESPT | | | 6.4 | 6.4 | 6.4 |
| Final stage | | | | | |
| Zinc oxide | | | | | 3 |
| 6PPD (Santoflex 13) | | | | | 1 |
| TMQ | | | | | 1 |
| DPG | | | | | 2 |
| CBS | | | | | 1.5 |
| Sulfur | 1.8 | 1.8 | 1.6 | 1.6 | 1.5 |
| TBBS | 2.4 | 2.4 | 2.4 | 2.4 | |

Abbreviations in Table 1
sSBR - solution polymerised styrene-butadiene rubber (sSBR Buna VSL 5025-2 HM)
cis-BR - cis polybutadiene rubber (Europrene NEO CIS BR40)
ENR-25 - epoxidised natural rubber (25 mol % epoxide units)
Zeosil 1165 MP - amorphous precipitated silica filler (Solvay)
N234 Black - carbon black filler
Nytex 4700 (Nynas) - heavy black naphthenic tyre oil
6PPD (Santoflex 13) - N-(1,3-dimethylbutyl)-N'-phenyl-p-phenylene diamine (antioxidant)
TMQ - polymerised 1,2-dihydro-2,2,4-trimethylquinoline (antioxidant)
TESPT - Bis[3-(triethoxysilyl)propyl] tetrasulphide (coupling agent)
DPG - diphenyl guanidine (accelerator)
CBS - N-cyclohexyl-2-benzothiazole sulphenamide (accelerator)
TBBS - N-tert-butyl-2-benzothiazyl sulphenamide (accelerator)

Coherence/Appearance

A visual assessment characterising the appearance for masterbatch compounds with water addition and/or with use of silane coupling agent, TESPT.

TABLE 2

| Appearance rating from 1-10 where 10 is good for dumped masterbatches | | | | | |
|---|---|---|---|---|---|
| Compound | 1 | 2 | 3 | 4 | 5 |
| Note | Control | 4% water at MB | 6.4 phr TESPT | 6.4 phr TESPT 4% water at MB | sSBR/BR |
| Coherence | 5 | 8 | 7 | 8 | 8 |
| Ease of milling | 3.5 | 6 | 5.5 | 6.5 | 7.5 |
| Surface appearance | 3.5 | 7.5 | 6 | 7.5 | 8 |

Mooney Viscosity at 100° C.

The Mooney viscosities were measured on the day after masterbatching, remilling and finalising.

TABLE 3

| Mooney viscosity ML (1 + 4 minute) | | | | |
|---|---|---|---|---|
| Compound | Note | Stage | Peak Mooney | Mooney at 4 minutes |
| 1 | Control | MB | 215.5 | 105.0 |
| | | R | 116 | 70 |
| | | F | 90.0 | 49.0 |
| 2 | 4% water at MB | MB | 109.0 | 67.0 |
| | | R | 72.5 | 51 |
| | | F | 59.5 | 39.0 |
| 3 | 6.4 phr TESPT | MB | 117.5 | 59.0 |
| | | R | 99 | 53 |
| | | F | 77.0 | 39.5 |
| 4 | 6.4 phr TESPT 4% water at MB | MB | 106.0 | 51.5 |
| | | R | 69.5 | 44.5 |
| | | F | 59.0 | 34.5 |
| 5 | sSBR/BR | MB | 200.5 | 156.5 |
| | | R | 143.5 | 103.5 |
| | | R2 | 134.0 | 99.0 |
| | | F | 105.0 | 70.0 |

*Masterbatch stage Mooney viscosities are small rotor values converted to large rotor values using the calculation ML = 2.1031MS − 14.911.

Storage Stability

TABLE 4

| Mooney viscosity ML (1 + 4 minute) | | | |
|---|---|---|---|
| Compound | Maturation, Days | Peak Mooney | Mooney at 4 minutes |
| 1 | 1 | 90.0 | 49.0 |
| | 7 | 158.5 | 60.5 |
| 2 | 1 | 59.5 | 39.0 |
| | 7 | 92.0 | 43.0 |
| 3 | 1 | 77.0 | 39.5 |
| | 7 | 121.0 | 47.0 |
| 4 | 1 | 59.0 | 34.5 |
| | 7 | 98.0 | 40.5 |
| 5 | 1 | 105.0 | 70.0 |
| | 7 | 110.0 | 74.0 |

Extrusion—Finish, Definition and Swell

Extrusion properties were assessed using an extruder with a 30 mm barrel diameter and a simple helical screw.

Compounds were rated to give a numerical score using ASTM D2230 System A.

TABLE 5

| Appearance ratings using Rating System A, ASTM D2230 extruded with Garvey Die 70° C., Barrel 60° C. and 30 rpm. | | | | | | |
|---|---|---|---|---|---|---|
| Compound | Note | Swelling and porosity | Edge | Surface | Corners | Total |
| 1 | Control | 3 | 3 | 3 | 4 | 13 |
| 2 | 4% water at MB | 4 | 3 | 4 | 4 | 15 |
| 3 | 6.4 phr TESPT | 3.5 | 3 | 3.5 | 4 | 14 |
| 4 | 6.4 phr TESPT 4% water at MB | 4 | 3 | 4 | 4 | 15 |
| 5 | sSBR/BR | 3 | 1 | 2.5 | 3 | 9.5 |

Swell properties were assessed using an extruder with a 30 mm barrel diameter and a simple helical screw fitted with a 10 mm diameter, 20 mm long rod die with conditions set as Die temperature 70° C. and Barrel temperature 60° C.

Extrudate swell=((strand diameter−capillary diameter)/capillary diameter)×100.

TABLE 6

Swell data for cooled extrudates using a Rod Die

| Compound | Note | l/d | Extrudate diameter shrinkage (swell) % |
|---|---|---|---|
| 1 | Control | 2 | (12.6) |
| 2 | 4% water at MB | 2 | 0.9 |
| 3 | 6.4 phr TESPT | 2 | (14.6) |
| 4 | 6.4 phr TESPT 4% water at MB | 2 | (13.4) |
| 5 | sSBR/BR | 2 | (19.2) |

Tack

A strip of rubber (ca. 20 g) heated to about 90° C. was laid onto a room temperature strip of the same rubber. A weight was applied to the strip, for approximately 5 seconds, and then the strips were upturned and the time that it could hold its own weight was recorded.

Compound 1 with water had the best tack and did not drop.

TABLE 7

Rating from 1-10 where 10 is good

| Compound | 1 | 2 | 3 | 4 | 5 |
|---|---|---|---|---|---|
| Note | Control | 4% water at MB | 6.4 phr TESPT | 6.4 phr TESPT 4% water at MB | sSBR/BR |
| Tack rating | 2 | 10 | 5 | 7 | 6 |
| Mooney viscosity ML (1 + 4) | 79 | 58 | 71 | 58 | 87 |

Physical Property Data

Test pieces were cured at a temperature of 172° C. for 12 minutes.

TABLE 8

Akron abrasion and Heat Build Up properties

| Compound | | 1 | 2 | 3 | 4 | 5 |
|---|---|---|---|---|---|---|
| Note | | Control | 4% water at MB | 6.4 phr TESPT | 6.4 phr TESPT 4% water at MB | sSBR/BR |
| Akron Abrasion | Index (%) | 161 | 190 | 232 | 235 | 204 |
| | Volume loss (mm$^3$) | 11.8 | 10.0 | 8.2 | 8.1 | 9.3 |
| HBU | Set (%) | 35.1 | 30.6 | 6.5 | 5.4 | 5.2 |
| | Temp. Rise (° C.) | 101 | 96 | 57 | 52 | 62 |

The value given is the median

The invention claimed is:

1. A method for preparing rubber compounds comprising one or more rubber containing polar functionality and one or more polar filler which method comprises the steps:

(i) adding a polar volatile liquid to the one or more polar filler, wherein the polar volatile liquid is added to the one or more polar filler in an amount of from 0.5% to 10% by weight based on the weight of the one or more polar filler;

(ii) mixing the one or more rubber containing polar functionality with the polar volatile liquid and the one or more polar filler to produce a dispersion of the one or more polar filler in the one or more rubber, wherein the one or more rubber containing polar functionality is selected from the group consisting of epoxidized natural rubber, hydroxylated natural rubber, carboxylated natural rubber, epoxidized synthetic rubbers, hydroxylated synthetic rubbers, carboxylated synthetic rubbers, carboxylated nitrile rubber, carboxylated styrene butadiene rubber, hydroxylated styrene butadiene rubber, hydroxylated butadiene rubber and mixtures thereof;

(iii) removing the polar volatile liquid from the dispersion; wherein the amount of the one or more rubber containing polar functionality blended with the one or more polar filler is about 100 parts by weight of rubber per 20 to 120 parts by weight of the one or more polar filler.

2. The method according to claim 1, wherein the one or more rubber containing polar functionality is epoxidized natural rubber.

3. The method according to claim 2, wherein the epoxide content of the epoxidized natural rubber is from 5 mol % to 75 mol %.

4. The method according to claim 2, wherein the epoxide content of the epoxidized natural rubber is from 5 mol % to 65 mol %.

5. The method according to claim 2, wherein the epoxide content of the epoxidized natural rubber is from 20 mol % to 55 mol %.

6. The method according to claim 1, wherein the one or more polar filler is selected from the group consisting of precipitated silica and carbon black modified to contain polar functionality.

7. The method according to claim 1, wherein the polar volatile liquid is water, a lower alkanol or a mixture thereof.

8. The method according to claim 7, wherein the lower alkanol is methanol, ethanol or propanol.

9. The method according to claim 8, wherein the lower alkanol is ethanol.

10. The method according to claim 1, wherein the polar volatile liquid is added to the one or more polar filler in an amount of from 2 to 6% by weight, based on the weight of the one or more polar filler.

11. The method according to claim 1, wherein the rubber compound obtained after removal of the polar volatile liquid is subsequently vulcanised.

12. A product obtained by the method of claim 11 which is a vehicle tyre.

* * * * *